United States Patent
Tsao et al.

(10) Patent No.: US 11,527,184 B2
(45) Date of Patent: Dec. 13, 2022

(54) IMAGE PLAYING SYSTEM AND IMAGE PLAYING METHOD

(71) Applicant: Coretronic Corporation, Hsin-Chu (TW)

(72) Inventors: Hao-Chang Tsao, Hsin-Chu (TW); Tsung-Hsin Yeh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/229,816

(22) Filed: Apr. 13, 2021

(65) Prior Publication Data

US 2021/0335158 A1 Oct. 28, 2021

(30) Foreign Application Priority Data

Apr. 22, 2020 (CN) .......................... 202010322265.9

(51) Int. Cl.
*G09G 3/00* (2006.01)
*B60Q 1/32* (2006.01)

(52) U.S. Cl.
CPC .............. *G09G 3/001* (2013.01); *B60Q 1/32* (2013.01); *B60Q 2400/40* (2013.01); *B60Q 2400/50* (2013.01); *G09G 2330/02* (2013.01); *G09G 2354/00* (2013.01)

(58) Field of Classification Search
CPC .............. G09G 3/001; G09G 2330/02; G09G 2354/00; B60Q 1/32; B60Q 2400/40; B60Q 2400/50
USPC ........................................................ 348/744
See application file for complete search history.

(56) References Cited

U.S. PATENT DOCUMENTS

| 2009/0282173 | A1* | 11/2009 | Cheng | ................. G11B 27/034 |
| | | | | 710/8 |
| 2014/0075314 | A1* | 3/2014 | Bachman | ................ G06F 16/61 |
| | | | | 715/716 |
| 2018/0056936 | A1* | 3/2018 | Parasu | ................ B60R 25/1001 |
| 2018/0178652 | A1* | 6/2018 | Monroe | ................. B60R 16/02 |
| 2019/0164344 | A1 | 5/2019 | Potter et al. | |

FOREIGN PATENT DOCUMENTS

| CN | 202091972 | 12/2011 |
| CN | 202264698 | 6/2012 |
| CN | 102767782 | 11/2012 |

(Continued)

OTHER PUBLICATIONS

"Search Report of Europe Counterpart Application", dated Aug. 19, 2021, p. 1-p. 6.

*Primary Examiner* — Mark Edwards
(74) *Attorney, Agent, or Firm* — JCIPRNET

(57) ABSTRACT

The invention relates to an image playing system and an image playing method. The image playing system includes a projection device. The projection device includes a storage circuit, a processor, and a projection module. The storage circuit stores a playing content including at least one multimedia content, a play time length and a play order corresponding to each multimedia content. The processor obtains the playing content from the storage circuit in response to receiving the power signal. The projection module is controlled by the processor and sequentially projects the multimedia content according to the play time length and play order corresponding to each multimedia content.

10 Claims, 6 Drawing Sheets

(56) References Cited

FOREIGN PATENT DOCUMENTS

| CN | 102767782 A | * 11/2012 | ............. B60Q 1/323 |
|----|-------------|-----------|--------------------------|
| CN | 110091830 | 8/2019 | |
| CN | 110103866 | 8/2019 | |

* cited by examiner

IMAGE PLAYING SYSTEM AND IMAGE PLAYING METHOD

CROSS-REFERENCE TO RELATED APPLICATION

This application claims the priority benefit of China application serial no. 202010322265.9, filed on Apr. 22, 2020. The entirety of the above-mentioned patent application is hereby incorporated by reference herein and made a part of this specification.

BACKGROUND

Technical Field

The invention relates to a multimedia playing technology, and particularly to an image playing system and an image playing method.

Description of Related Art

In the current welcome light technologies, especially the technology of welcome lights for vehicles, the welcome light is activated correspondingly when the door is detected as being opened, so as to project and display a specific welcome pattern on a specific surface (e.g., the ground). The structure of such welcome light generally includes a light source, a film on which a welcome pattern is drawn, and a lens. When the door is opened, the light source may project the welcome pattern through the lens on the film onto the specific surface for the user to view.

However, the welcome pattern which the technology is able to provide is limited to the pattern on the current film, so the flexibility of the technology is limited. When intending to use the welcome light to display other patterns, the user needs to disassemble the welcome light and replace the film by him/herself, which results in certain difficulties and inconveniences in practice.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The embodiments of the invention provide an image playing system and an image playing method.

The invention provides an image playing system, including a projection device having a storage circuit, a processor, and a projection module. The storage circuit stores a playing content. The playing content includes at least one multimedia content, a play time length, and a play order corresponding to each multimedia content, the processor is coupled to the storage circuit and obtains the playing content from the storage circuit in response to receiving a power signal, and the projection module is coupled to the processor and controlled by the processor to sequentially project the at least one multimedia content according to the play time length and the play order corresponding to each multimedia content.

The invention provides an image playing method, adapted for an image playing system including a projection device. The image playing method includes obtaining a playing content by the projection device in response to receiving a power signal, wherein the playing content comprises at least one multimedia content, a play time length and a play order corresponding to each of the at least one multimedia content; and sequentially projecting, by the projection device, the at least one multimedia content according to the play time length corresponding to each of the at least one multimedia content and the play order.

Based on the above, the image playing system and the image playing method of the invention can provide diverse and easily updated multimedia content during projection.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

DESCRIPTION OF THE EMBODIMENTS

Figure 1:
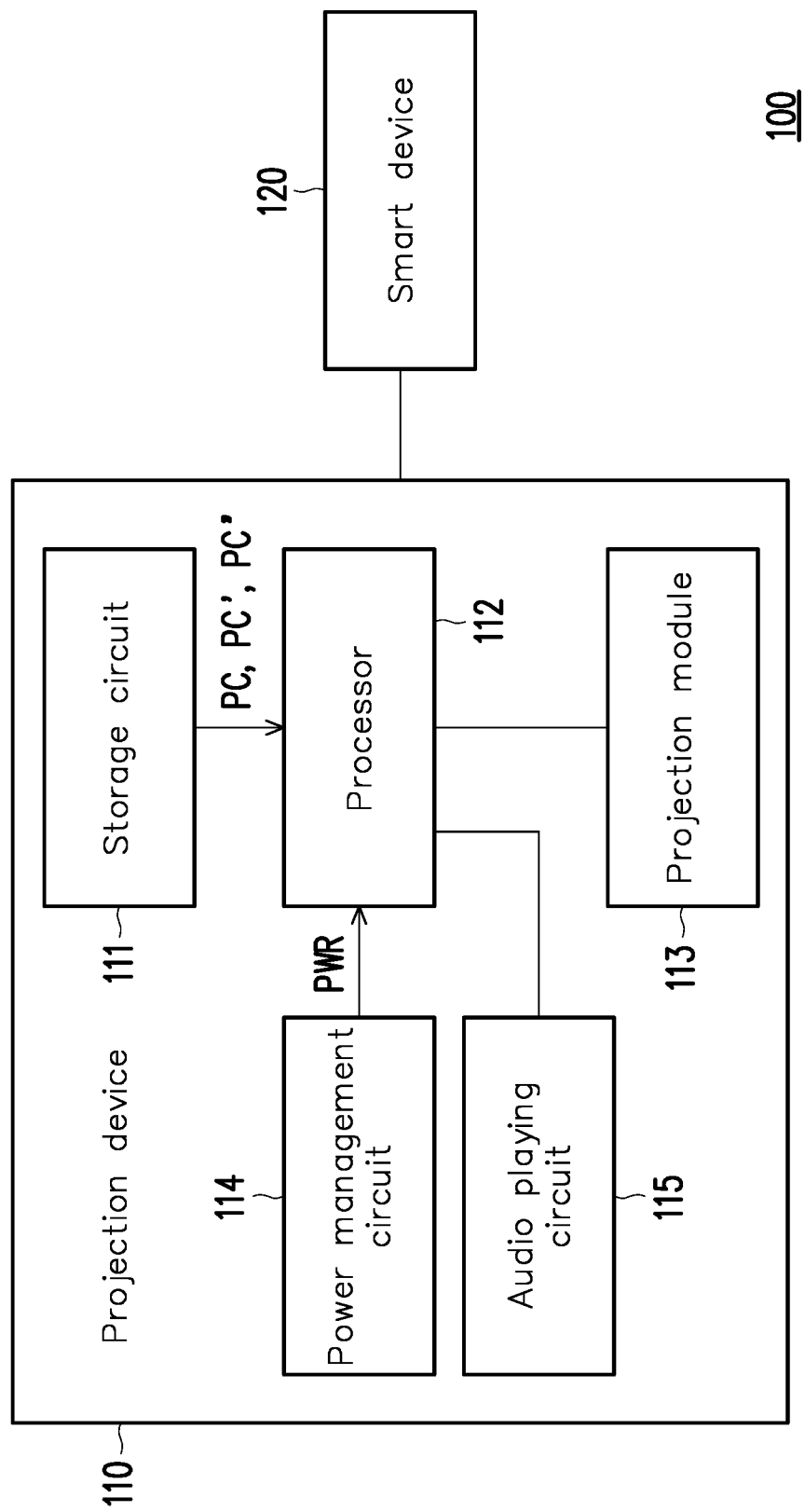
FIG. 1 is a schematic view depicting an image playing system according to an embodiment of the invention.

Referring to FIG. 1, FIG. 1 is a schematic view depicting an image playing system according to an embodiment of the invention. As shown in FIG. 1, an image playing system 100 includes a projection device 110.

As shown in FIG. 1, the projection device 110 includes a storage circuit 111, a processor 112, and a projection module 113. The storage circuit 111 is configured to store a playing content PC. The storage circuit 111, for example, may be any type of fixed or removable random access memory (RAM), read-only memory (ROM), flash memory, hard disk, or other similar devices or a combination of the aforementioned devices, and may be configured to record multiple program codes or modules.

The processor 112 is coupled to the storage circuit 111 and may be a general-purpose processor, a dedicated processor, a conventional processor, a digital signal processor, multiple microprocessors, one or more microprocessors combined with a core of a digital signal processor, a controller, a microcontroller, an application specific integrated circuit (ASIC), a field programmable gate array (FPGA), any other kind of integrated circuits, state machines, processors based on advanced reduced instruction set machines (ARMs), and similar devices. The processor 112 obtains (e.g., loads) the playing content PC from the storage circuit 111 in response to receiving a power signal PWR (e.g., power on).

The projection module 113 is coupled to the processor 112 and may optionally include a non-electronic component, such as a projection lens and a lens element, etc., and a light source (not shown). The projection device 110 may optionally include a power management circuit 114. The power management circuit 114 may be coupled to the processor 112 and, in some embodiments, may provide the processor 112 with the power signal PWR in response to a vehicle door opening state. In an embodiment, the vehicle door opening state may be detected by a vehicle door opening detector (not shown) disposed on the vehicle body, and the power management circuit 114 is notified with a predetermined signal. In other embodiments, the power management circuit 114 may also provide the processor 112 with the power signal PWR in response to other events/states (e.g., a key being inserted into a keyhole on the vehicle body, a remote control opening a door lock, or a sensor approaching the vehicle, etc.). However, the invention is not limited thereto.

In some embodiments, the projection device 110 is, for example, a vehicle welcome light, and the projection device 110 may be disposed on the vehicle body, and may project, for example, the multimedia content of the playing content PC stored in the storage circuit 111 onto the ground or other surfaces in response to the vehicle door opening state. However, the invention is not limited thereto. In an embodiment of the invention, the playing content PC may include at least one multimedia content and the play time length and the play order corresponding to each multimedia content. The projection module 113 is controlled by the processor 112 and sequentially projects at least one multimedia content according to the play time length and the play order corresponding to each multimedia content. In different embodiments, each multimedia content may include a pattern, a film, a sound effect, and/or other similar content, but the invention may not be limited thereto.

In FIG. 1, the image playing system 100 may optionally include a smart device 120. The smart device 120 is, for example, a smart phone, a tablet computer, or other similar devices, and the smart device 120 may allow a user to edit (e.g., program) the playing content PC on the smart device 120 and then transmit the playing content PC (edited playing content) to the projection device 110 through a wired or wireless connection interface (e.g., Bluetooth, USB, etc.), such as directly transmitting the playing content PC to the storage circuit 111. In this way, even if the processor 112 of the projection device 110 is in a standby state (not in operation), the smart device 120 may still be allowed to transmit the playing content PC. In some embodiments, the smart device 120 may edit/plan/program the playing content PC in an offline state in which the smart device 120 is not connected to the projection device 110 (e.g., the distance between the smart device 120 and the projection device 110 exceeds the transmission range of the wired or wireless connection interface, or the projection device 110 is not activated) and transmit the playing content PC to the projection device 110 through the wired or wireless connection interface after being connected to the projection device 110. In addition, the smart device 120 may also edit/plan/program the playing content PC under the condition that the smart device 120 is connected to the projection device 110 and transmit the playing content PC to the projection device 110 through the wired or wireless connection interface after the editing/planning/programing of the playing content PC is completed.

In addition, in other embodiments, the projection device 110 may also obtain the playing content PC by other means (e.g., a predetermined external/cloud storage device, etc.), but the invention is not limited thereto.

Figure 2:
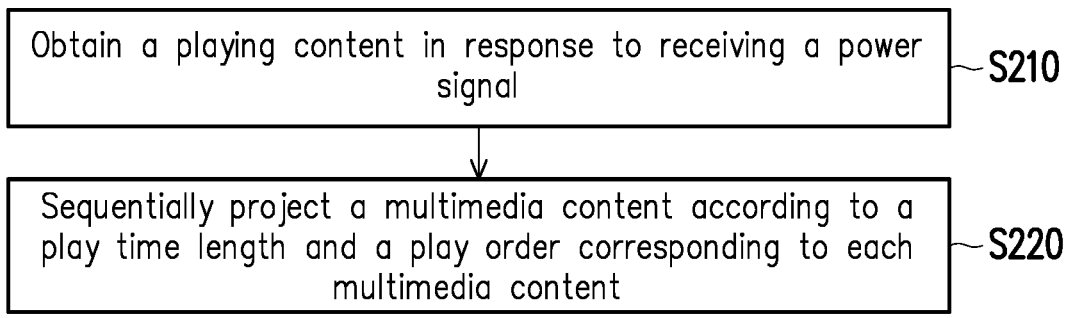
FIG. 2 is a flowchart depicting an image playing method according to an embodiment of the invention.

Referring to FIG. 2, FIG. 2 is a flowchart depicting an image playing method according to an embodiment of the invention. The method of the embodiment may be performed by the projection device 110 of FIG. 1. The details of each step in FIG. 2 are described below with reference to the components shown in FIG. 1.

First, in step S210, in response to receiving the power signal PWR, the projection device 110 may obtain the playing content PC. Specifically, in an embodiment, the processor 112 of the projection device 110 may, in response to receiving the power signal PWR, obtain (e.g., load) the playing content PC (which includes at least one multimedia content and the play time length and the play order corresponding to each multimedia content) from the storage circuit 111. In another embodiment, in response to the processor 112 of the projection device 110 receiving the power signal PWR, the projection device 110 may obtain (e.g., download or receive) the playing content PC from the smart device 120 or a specific external/cloud storage device. Next, in step S220, the projection device 110 may sequentially project the multimedia content according to the play time length and the play order corresponding to each multimedia content. For example, after the processor 112 obtains the playing content PC, the projection device 110 may correspondingly control the projection module 113 to sequentially project the multimedia content in the playing content PC according to the play time length and the play order corresponding to each multimedia content. In some embodiments, the processor 112 may include a temporary storage circuit, and after being obtained from the storage circuit 111, the playing content PC may be loaded into the temporary storage circuit. However, the invention is not limited thereto.

More specifically, in an embodiment, the multimedia content in the playing content PC recorded in the storage circuit 111 includes a first multimedia content (e.g., a first film) and a second multimedia content (e.g., a first pattern). The playing content PC also includes a first play time length (e.g., 5 seconds) corresponding to the first multimedia content and a second play time length (e.g., 10 seconds) corresponding to the second multimedia content. In addition, the play order of the first multimedia content and the second multimedia content recorded in the playing content PC may be that the first multimedia content precedes the second multimedia content, for example, and may be in a text script file format. In other embodiments, the playing content PC may also sort and play the first multimedia content before the second multimedia content by sequentially recording the first multimedia content and the second multimedia content. However, the invention is not limited thereto. In another embodiment, the play time length and the play order of each multimedia content may be integrated in a text script file format. In particular, if the multimedia content is a film, the play time length of the film may be equal to or not equal to the original time length of the film, and the length of the film may be appropriately cut short (e.g., the part exceeding the play time length is not played), or the original time length of the film is scaled to meet the play time length. If the multimedia content is a pattern, the play time length of the pattern may be defined arbitrarily without being forced to have the same time length for each pattern by the system. However, the invention is not limited thereto.

In this case, when obtaining the playing content PC, the processor 112 may control the projection module 113 to project the first multimedia content (i.e., the first film) according to the play order (aforementioned). After that, when the projection module 113 has projected the first multimedia content for the first play time length (i.e., 5 seconds), the processor 112 may control the projection module 113 to project the second multimedia content (i.e., the first pattern) according to the play order and keep projecting the second multimedia content for the second play time length (i.e., 10 seconds).

In an embodiment, when the projection module 113 has projected the second multimedia content for the second play time length (i.e., 10 seconds), the processor 112 may correspondingly disable the projection module 113 to stop projection. That is, after determining that the projection of the first multimedia content and the second multimedia content has been completed according to the playing content PC, the processor 112 may control the projection module 113 to stop projecting any content. In this case, after opening the door and perceiving that the first film has been played/projected by the projection device 110 for 5 seconds, the user then perceives that the projection device 110 switches to play/project the first pattern. Then, after the first pattern is played for 10 seconds, the user is unable to perceive any multimedia content because the projection module 113 is disabled.

In another embodiment, when the projection module 113 has projected the second multimedia content for the second play time length (i.e., 10 seconds), the processor 112 may again control the projection module 113 to play the multimedia content according to the playing content PC. That is, the processor 112 may control the projection module 113 to repeatedly project the first multimedia content and the second multimedia content according to the playing content PC. In this case, the user may open the door and perceive that the first film is played/projected by the projection device 110 for 5 seconds and then perceive that the projection device 110 switches to play/project the first pattern. Then, 10 seconds after the first pattern is played, the user once again perceives the first film played/projected by the projection device 110. The same process may keep repeating.

In addition, in other embodiments, in addition to the content PC, the storage circuit 111 may also store another playing content PC', and the playing content PC' may include at least another multimedia content. In an embodiment, after completion of playing/projecting of the first multimedia content and the second multimedia content according to the playing content PC, the processor 112 may then play/project other multimedia content according to the another playing content PC'.

For example, the multimedia content recorded in the another playing content PC' includes a third multimedia content (e.g., a second pattern) and a fourth multimedia content (e.g., a second film). In addition, a third play time length corresponding to the third multimedia content is, for example, 3 seconds, and a fourth play time length corresponding to the fourth multimedia content is, for example, 4 seconds. In addition, the play order of the third multimedia content and the fourth multimedia content recorded in the another playing content PC' may be that the third multimedia content precedes the fourth multimedia content.

In this case, when the projection module 113 has projected the second multimedia content for the second play time length (i.e., 10 seconds), the processor 112 may then control the projection module 113 to project the third multimedia content (i.e., the second pattern) according to the play order of the another playing content PC'. After that, when the projection module 113 has projected the third multimedia content for the third play time length (i.e., 3 seconds), the processor 112 may then control the projection module 113 to project the fourth multimedia content (i.e., the second film) according to the play order of the another playing content PC'. Moreover, after the projection module 113 has projected the fourth multimedia content for the fourth play time length (i.e., 4 seconds), the processor 112 may correspondingly disable the projection module 113 or repetitively sequentially project the playing content PC and the another playing content PC'. However, the invention is not limited thereto.

In other embodiments, the another playing content PC' may also record the same multimedia content as that of the playing content PC, and the play order of the respective multimedia contents in the another playing content PC' may be different from that of the playing content PC. For example, the another playing content PC' may also include the first multimedia content and the second multimedia content, but the play order of the two multimedia contents in the another playing content PC' may be that the second multimedia precedes the first multimedia content. However, the invention is not limited thereto.

In an embodiment, the projection device 110 may optionally include an audio playing circuit 115. Therefore, if the multimedia content currently projected by the projection device 110 has audio components (e.g., sound effects, music, etc.), the audio playing circuit 115 (e.g., a speaker) coupled to the processor 112 may be configured to play the audio components. However, the invention is not limited thereto.

In some embodiments, while the projection device 110 projects the playing content PC due to the opening of the vehicle door, the smart device 120 may simultaneously transmit a new playing content PC" to the projection device 110, so that the projection device 110 may store the new playing content PC" in the storage circuit 111. In this case, when the projection device 110 completes the projection of the playing content PC (e.g., the second multimedia content has been played for the second play time length), the projection device 110 may then project the multimedia content in the new playing content PC".

Specifically, in some embodiments, the new content PC" may also serve to replace the content PC stored in the storage circuit 111. In this case, the processor 112 may first load the playing content PC into the temporary storage circuit when the door is opened to perform the current projection based on the playing content PC, and the processor 112 may simultaneously update the playing content PC in the storage circuit 111 to the new playing content PC". After that, at the next time the door is opened, the projection device 110 may perform projection again based on the new content PC". However, the invention is not limited thereto.

In other embodiments, the invention also proposes a mechanism by which the smart device 120 plans the multimedia content and the corresponding play time length and the play order to generate the playing content PC. Details in this regard will be described in the following.

Figure 3:
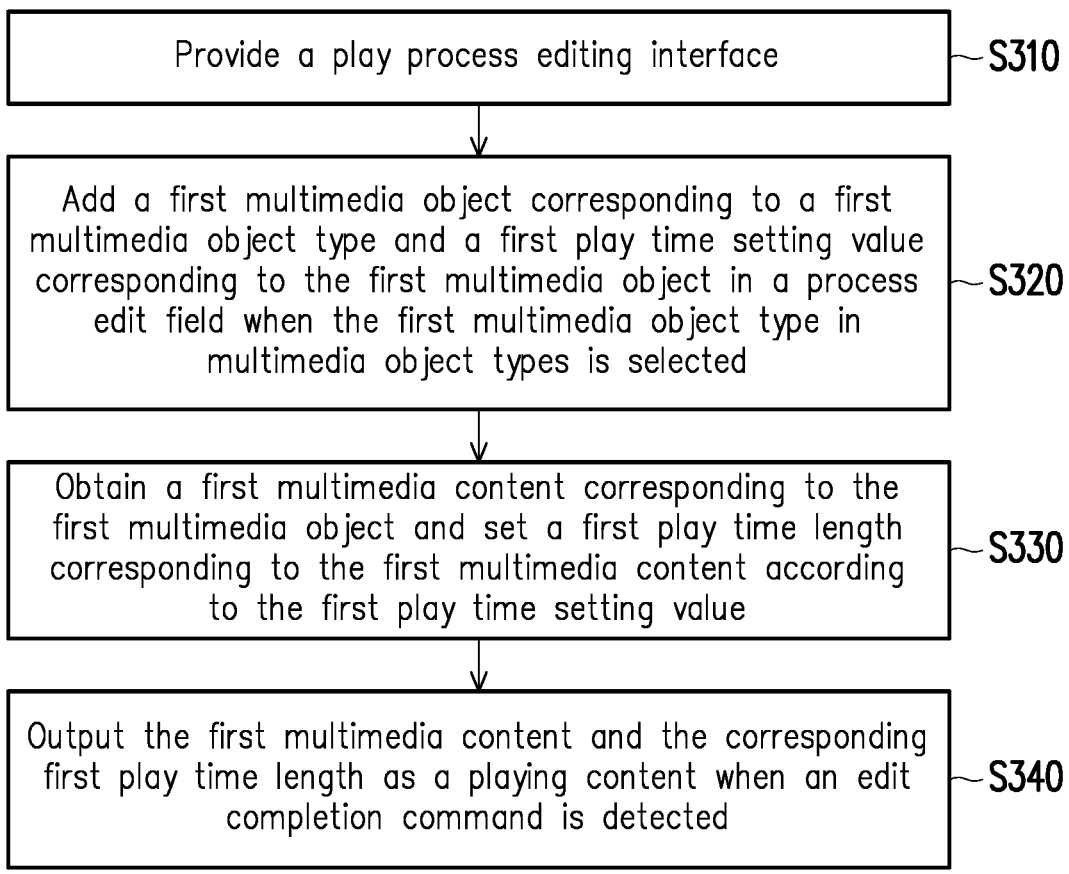
FIG. 3 is a flowchart depicting a method of planning and generating a playing content according to an embodiment of the invention.

Referring to FIG. 3, FIG. 3 is a flowchart depicting a method of planning and generating a playing content according to an embodiment of the invention. The method of the embodiment may be performed by the smart device 120 of FIG. 1. Details of each step in FIG. 3 are described below with reference to the components shown in FIG. 1. In addition, in order to facilitate the understanding of the concept of FIG. 3, the scenarios shown in FIGS. 4A to 4D are described below as supplementation. However, these figures only serve as an example and are not intended to limit possible implementations of the invention.

Figure 4A:
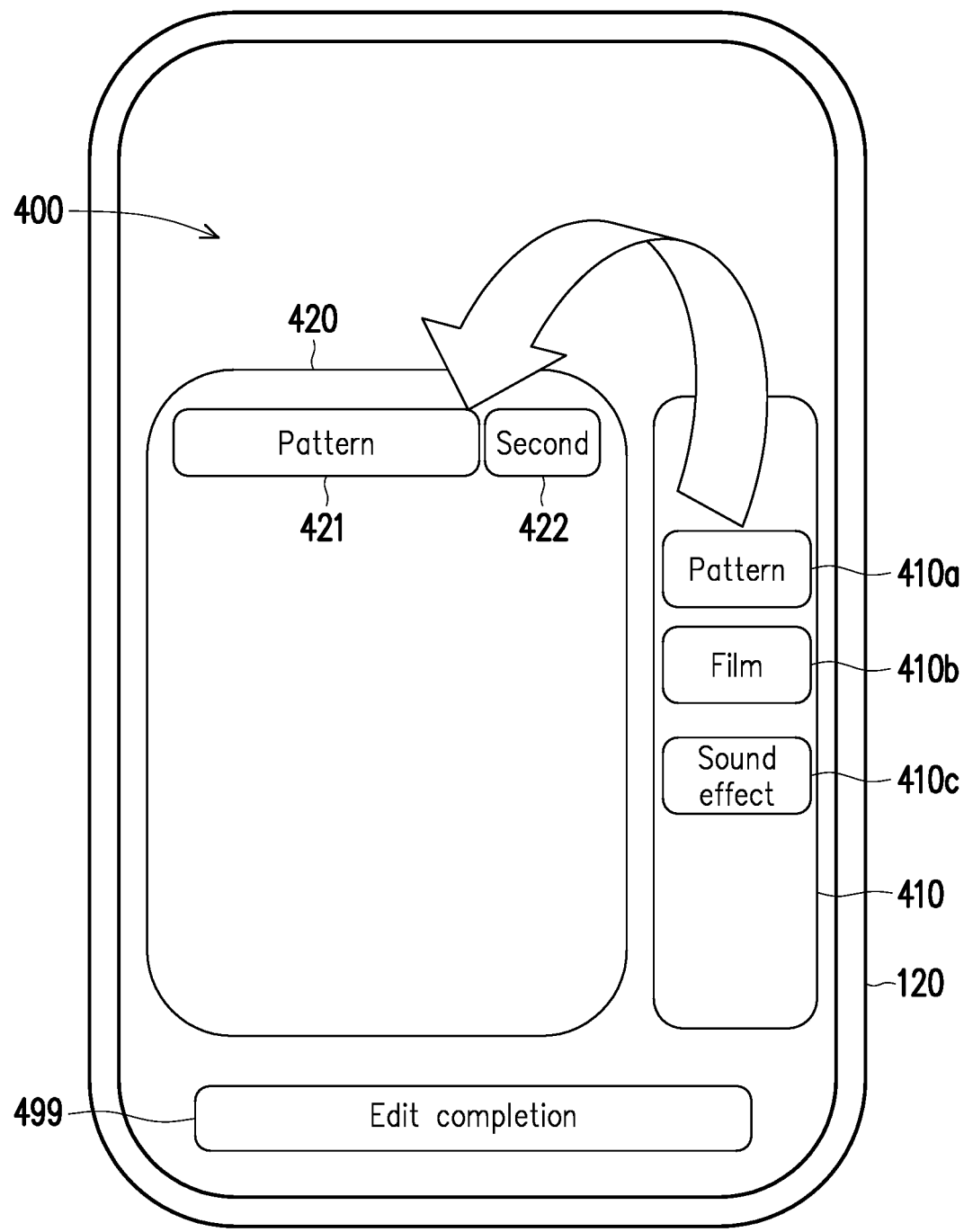
FIG. 4A to FIG. 4D are schematic views depicting scenarios of planning playing contents according to an embodiment of the invention.

First, in step S310, the smart device 120 may provide a play process editing interface 400 shown in FIG. 4A. In an embodiment, the smart device 120 may be installed with an application program for editing the playing content PC, and the play process editing interface 400 is, for example, one of the interfaces presented after the application program is started. However, the invention is not limited thereto.

In FIG. 4A, the play process editing interface 400 may include a multimedia content type field 410 and a process editing field 420. The multimedia content type field 410 may include a multimedia object type 410a (e.g., a "pattern" type), a multimedia object type 410b (e.g., a "film" type), and a multimedia object type 410c (e.g., a "sound effect" type).

After that, in step S320, when a first multimedia object type (one of multimedia object type 410a, 410b and 410c) in the multimedia object types is selected, the smart device 120 may add a first multimedia object corresponding to the first multimedia object type and a first play time setting value corresponding to the first multimedia object in the process edit field 420.

For example, if the user wants to add a first multimedia object of the "pattern" type, the use may select the multimedia object type 410a as the first multimedia object type by dragging the multimedia object type 410a into the process edit field 420, but the invention is not limited thereto. In other embodiments, the multimedia object type 410a may be selected as the first multimedia object type by single clicking or double clicking the multimedia object type 410a. Correspondingly, the smart device 120 may add the first multimedia object corresponding to the multimedia object type 410a and the first play time setting value corresponding to the first multimedia object in the process edit field 420.

In FIG. 4A, after the multimedia object type 410a is selected, the smart device 120 may first add a button 421 corresponding to the first multimedia object and a button 422 of the first play time setting value in the process edit field 420, and then the user may edit the first multimedia object and the first play time setting value respectively by triggering the button 421 and the button 422. However, the invention is not limited thereto. In other embodiments, the first multimedia object may be selected in the multimedia object type 410a, and the button 421 corresponding to the first multimedia object can serve to replace the first multimedia object.

After that, in step S330, the smart device 120 may obtain the first multimedia content corresponding to the first multimedia object and set the first play time length corresponding to the first multimedia content according to the first play time setting value. Taking FIG. 4B as an example, the smart device 120 may obtain the pattern corresponding to the "Logo-2.jpg" object as the first multimedia content and set the first play time length of the first multimedia content to 20 seconds.

Figure 4B:
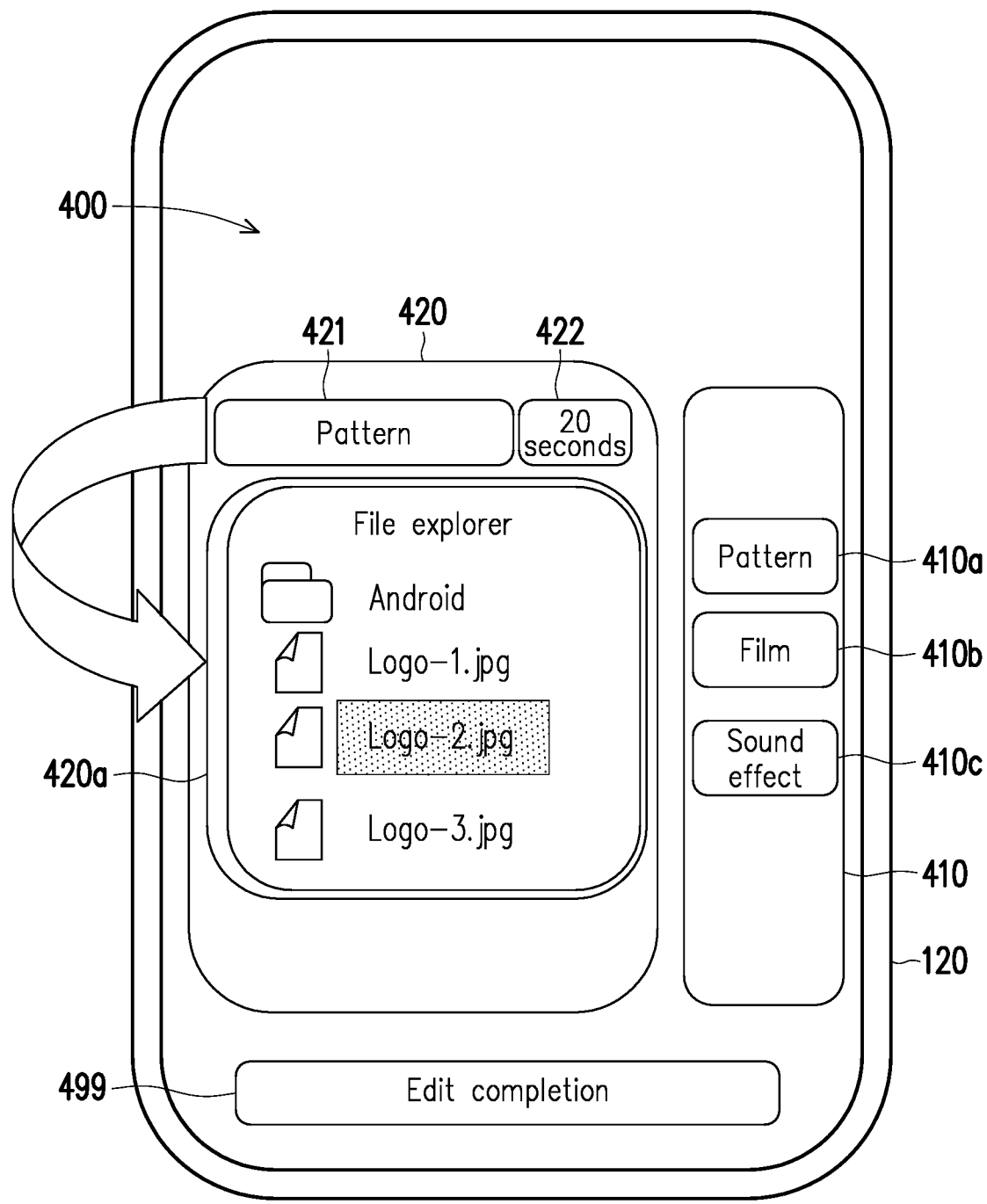

Specifically, as shown in FIG. 4B, when the user triggers the button 421, the smart device 120 may correspondingly provide a sub-interface 420a (e.g., a folder path) that may serve to select the first multimedia object for the user to find out the required object as the first multimedia object. In FIG. 4B, if the user selects the "Logo-2.jpg" object as shown, the smart device 120 may correspondingly define the object as the first multimedia object. However, the invention is not limited thereto. In addition, when the user triggers the button 422, the smart device 120 may correspondingly provide a sub-interface (e.g., a dialog box or a menu) that may serve to set the first play time setting value for the user to input the desired time length (e.g., 20 seconds as shown in FIG. 4B).

In an embodiment, if the user only needs 20 seconds of the first multimedia content as the playing content PC, the user may, for example, trigger an edit completion button 499 in the play process editing interface 400 to provide an edit completion command to the smart device 120 to end the editing of the playing content PC.

Correspondingly, in step S340, when the edit completion command is detected, the smart device 120 may output the first multimedia content and the corresponding first play time length as the playing content PC and may transmit the playing content PC to the projection device 110 to be stored in the storage circuit 111 at an appropriate timing.

In other embodiments, if the user still wants to continue editing the playing content PC after editing the first multimedia content and the corresponding first play time length, the user may not press the edit completion button 499 (i.e., not to provide the smart device 120 with the edit completion command) and performs the operations similar to step S320 and step S330 again.

For example, when a second multimedia object type in the multimedia object types 410a to 410c is selected, the smart device 120 may add a second multimedia object corresponding to the second multimedia object type, a second play time setting value corresponding to the second multimedia object, and the play order corresponding to the first multimedia object and second multimedia object in the process editing field 420.

Figure 4C:
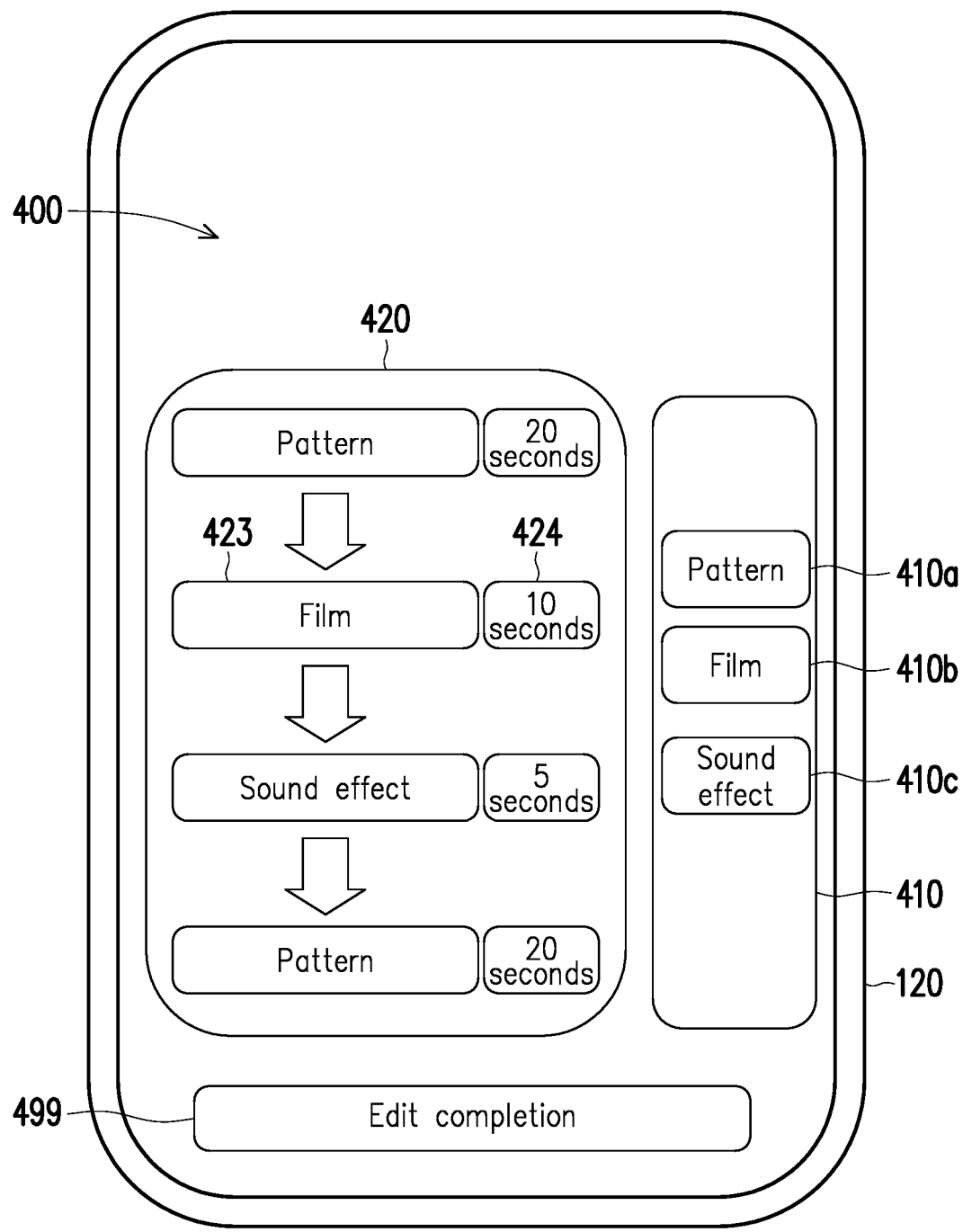

Taking FIG. 4C as an example, if the user then selects the multimedia object type 410b (i.e., the "film" type) as the second multimedia object type after editing the first multimedia content and the corresponding first play time length, then the smart device 120 may add the buttons 423 and 424 in the process editing field 420 according to the previous teaching so that the user may accordingly edit the second multimedia object (e.g., a film file) and the second play time setting value (e.g., 10 seconds as shown). Details in this regard will not be repeated in the following.

In addition, since the second multimedia object is placed in the play process editing interface 400 after the first multimedia object, the smart device 120 may correspondingly determine the first multimedia content corresponding to the first multimedia object should be sorted before the second multimedia content corresponding to the second multimedia object.

After that, the smart device 120 may obtain the second multimedia content (e.g., the film) corresponding to the second multimedia object and set the second play time length corresponding to the second multimedia content according to the second play time setting value (e.g., 10 seconds).

In an embodiment, if the user only needs 20 seconds of the first multimedia content and 10 seconds of the second multimedia content as the playing content PC, then, for example, the user may trigger the edit completion button 499 in the play process editing interface 400 to provide the smart device 120 with an edit completion command to end the editing of the playing content PC.

Correspondingly, when detecting the edit completion command, the smart device 120 may output the first multimedia content, the first play time length, the second multimedia content, the second play time length and the play order as the playing content PC.

In other embodiments, if the user still wants to continue editing the playing content PC after editing the first multimedia content, the first play time length, the second multimedia content, and the second play time length, the user may not press the edit completion button 499 (i.e., not to provide the smart device 120 with the edit completion command) and performs the operation similar to step S320 and step S330 again.

As shown in FIG. 4C, if the user has edited a total of four multimedia contents as shown edited in the play process editing interface 400 according to the previous teaching, after the user presses the edit completion button 499, the smart device 120 may correspondingly generate the playing content PC of FIG. 4C.

Figure 4D:
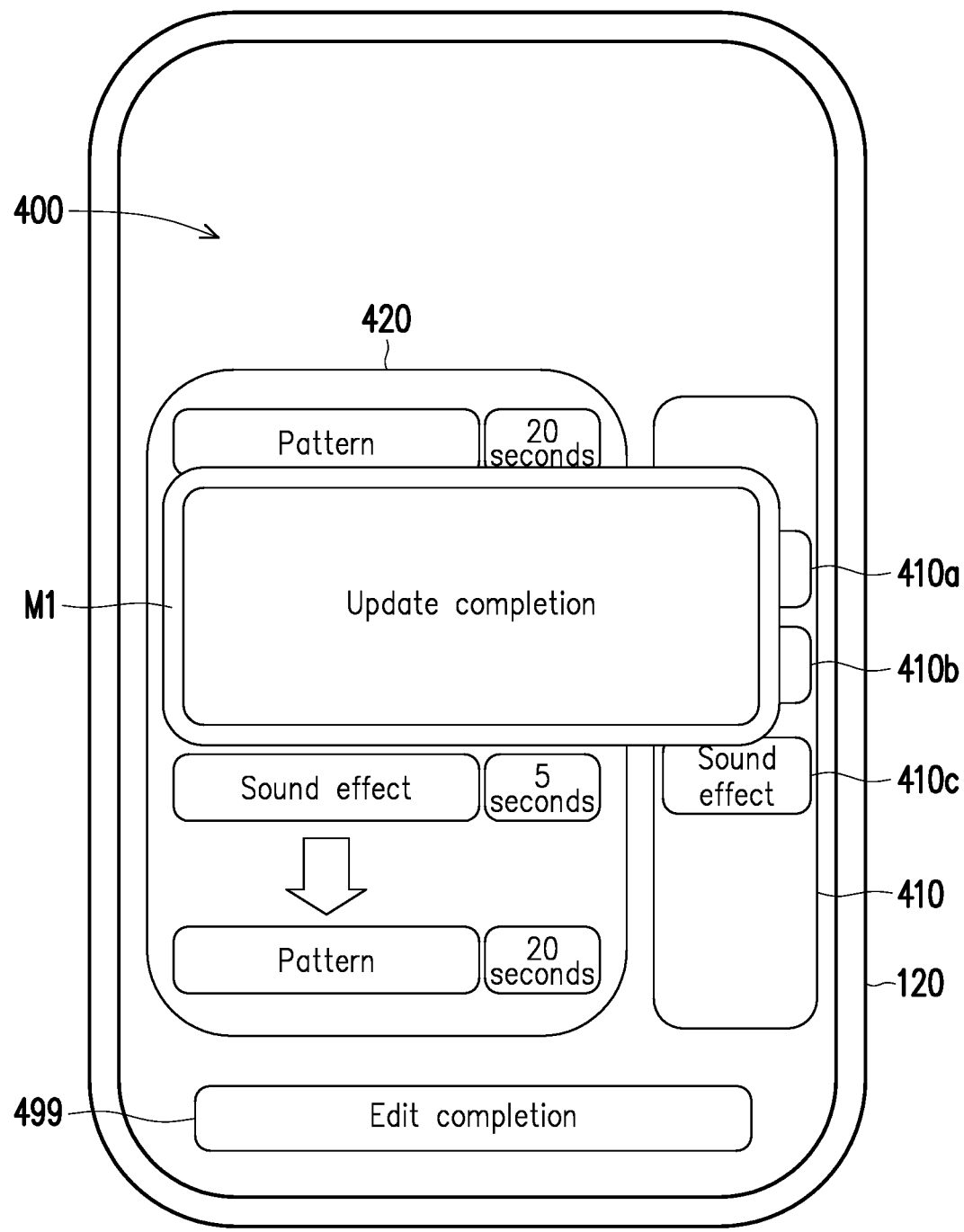

In an embodiment, as shown in FIG. 4D, after the smart device 120 generates the playing content PC and correspondingly transmit the generated playing content PC to the projection device 110 to update the projection device 110. Moreover, after completing the update of the projection device 110, the smart device 120 may accordingly display a completion message M1 to prompt the user. However, the invention is not limited thereto.

In summary, unlike the conventional welcome light projection method limited to film patterns, the image projection system proposed in the embodiments of the invention can provide a variety of multimedia contents as welcome content. Moreover, since the playing content of the invention may be planned by the user on the smart device and then transmitted to the projection device, there is no need to disassemble the projection device as is conventionally done, so it is less difficult in updating the playing content on the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image playing system, comprising:
 a projection device, the projection device comprising a storage circuit, a processor, and a projection module, wherein:
  the storage circuit stores a playing content comprising at least one multimedia content, a play time length and a play order corresponding to each of the at least one multimedia content,
  the processor is coupled to the storage circuit and obtains the playing content from the storage circuit in response to receiving a power signal, and
  the projection module is coupled to the processor and controlled by the processor to sequentially project the at least one multimedia content according to the play time length and the play order corresponding to each of the at least one multimedia content; and
 a smart device, wherein the smart device is connected to the projection device through a connection interface, the smart device is configured to transmit the playing content to the projection device through the connection interface, and the smart device is configured to:
  plan the at least one multimedia content, the corresponding play time length and the play order to generate the playing content;
  provide a play process editing interface, wherein the play process editing interface comprises a multimedia content type field and a process edit field, wherein the multimedia content type field comprises at least one multimedia object type;
  add a first multimedia object corresponding to a first multimedia object type and a first play time setting value corresponding to the first multimedia object in the process edit field when the first multimedia object type in the at least one multimedia object type is selected;
  obtain a first multimedia content corresponding to the first multimedia object and set a first play time length corresponding to the first multimedia content according to the first play time setting value; and
  output the first multimedia content and the corresponding first play time length as the playing content when an edit completion command is detected.

2. The image playing system according to claim 1, wherein the projection device is disposed on a vehicle body and configured to project the at least one multimedia content onto a ground.

3. The image playing system according to claim 1, wherein the projection device further comprises a power management circuit coupled to the processor, and the power management circuit provides the power signal in response to a vehicle door opening state.

4. The image playing system according to claim 1, wherein the at least one multimedia content comprises a first multimedia content and a second multimedia content, the playing content comprises a first play time length and a second play time length respectively corresponding to the first multimedia content and the second multimedia content, the play order is the first multimedia content and the second multimedia content, and the processor is configured to:
- control the projection module to project the first multimedia content; and
- control the projection module to project the second multimedia content when the projection module has projected the first multimedia content for the first play time length.

5. The image playing system according to claim 4, wherein the processor is further configured to:
- disable the projection module to stop projection when the projection module has projected the second multimedia content for the second play time length.

6. The image playing system according to claim 4, wherein the storage circuit stores another playing content, the another playing content at least comprises another multimedia content, and the processor is further configured to:
- control the projection module to project the another multimedia content according to the another playing content when the projection module has projected the second multimedia content for the second play time length.

7. The image playing system according to claim 1, wherein the projection device further comprises an audio playing circuit coupled to the processor, and the audio playing circuit is configured to play an audio component in each of the at least one multimedia content.

8. The image playing system according to claim 1, wherein the at least one multimedia content comprises a pattern, a film, and a sound effect.

9. The image playing system according to claim 1, wherein when the edit completion command is not detected, the smart device is further configured to:
- add a second multimedia object corresponding to a second multimedia object type, a second play time setting value corresponding to the second multimedia object, and the play order corresponding to an order of the first multimedia object and the second multimedia object when the second multimedia object type of the at least one multimedia object type is selected;
- obtain a second multimedia content corresponding to the second multimedia object and set a second play time length corresponding to the second multimedia content according to the second play time setting value; and
- output the first multimedia content, the first play time length, the second multimedia content, the second play time length, and the play order as the playing content when the edit completion command is detected.

10. An image playing method, adapted for an image playing system comprising a projection device and a smart device, the image playing method comprising:
- obtaining a playing content by the projection device in response to receiving a power signal, wherein the playing content comprises at least one multimedia content, a play time length and a play order corresponding to each of the at least one multimedia content; and
- sequentially projecting, by the projection device, the at least one multimedia content according to the play time length and the play order corresponding to each of the at least one multimedia content;
- transmitting, by the smart device, the playing content to the projection device through the connection interface, and the smart device is configured to plan the at least one multimedia content, the corresponding play time length and the play order to generate the playing content;
- providing, by the smart device, a play process editing interface, wherein the play process editing interface comprises a multimedia content type field and a process edit field, wherein the multimedia content type field comprises at least one multimedia object type;
- adding, by the smart device, a first multimedia object corresponding to a first multimedia object type and a first play time setting value corresponding to the first multimedia object in the process edit field when the first multimedia object type in the at least one multimedia object type is selected;
- obtaining, by the smart device, a first multimedia content corresponding to the first multimedia object and setting a first play time length corresponding to the first multimedia content according to the first play time setting value; and
- outputting, by the smart device, the first multimedia content and the corresponding first play time length as the playing content when an edit completion command is detected.

* * * * *